United States Patent [19]

Marié et al.

[11] 4,185,889

[45] Jan. 29, 1980

[54] TEMPERATURE GRADIENT LIGHT WAVEGUIDE

[75] Inventors: Georges R. P. Marié, Fontenay-aux-Roses; Jacques Allanic, Sceaux; Yves J. Peltier, Paris, all of France

[73] Assignee: Etat Francais Societe Anonyme de Telecommunication, Paris, France

[21] Appl. No.: 927,332

[22] Filed: Jul. 24, 1978

[30] Foreign Application Priority Data

Jul. 27, 1978 [FR] France .................. 77 23054

[51] Int. Cl.² .................................................. G02B 5/14
[52] U.S. Cl. ............................ 350/96.32; 350/96.29; 350/179
[58] Field of Search ................... 350/96.32, 96.29, 179

[56] References Cited

U.S. PATENT DOCUMENTS

| | | | |
|---|---|---|---|
| 3,390,932 | 7/1968 | McAfee, Jr. | 350/96.32 |
| 3,399,012 | 8/1968 | Peters | 350/96.32 |
| 3,415,588 | 12/1968 | Berreman | 350/96.32 |

*Primary Examiner*—Stewart J. Levy
*Attorney, Agent, or Firm*—Abraham A. Saffitz

[57] ABSTRACT

Guide for light or infrared wave beam in which a radial temperature gradient deflects towards the guide axis the light rays which tend to diverge therefrom. The isotherm pattern of two sets of four heater wires, each set being formed of pairs of wires diametrically opposite with respect to the guide axis, is calculated and it is shown that it comprises a particular isothermic curve which has the shape of a bean and separates the two sets of wires. The metal wall of the guide is given the shape of this particular isothermic curve and the set of heater wires outside this wall is omitted.

6 Claims, 7 Drawing Figures

TEMPERATURE GRADIENT LIGHT WAVEGUIDE

BACKGROUND OF THE INVENTION

1. Field of the Invention

The invention relates in general to systems for guiding a light or infrared beam by means of a refraction index gradient produced by a temperature gradient in a gas.

More specifically, the invention relates to a guide for light or infrared waves mainly comprising a sectional metal tube twisted in a helix having a very long pitch relative to its cross-section, the center of the guide, where the beam propagates, containing air which flows slowly and without turbulence, a suitable temperature gradient being maintained in the guide by electric wires heated by Joule effect and borne by an insulating frame secured to the wall.

2. Description of the Prior Art

U.S. Pat. No. 3,415,588 issued Dec. 10, 1968 to Dwight W. Berreman has proposed to introduce moderate temperature gradients transversely to the path traversed by a ultrahigh frequency wave energy beam in an enclosing conduit, the gradient being distributed along the path and varied in their transverse angular directions in such manner that rays which tend to diverge from the axis of the beam are repeatedly deflected toward the axis in such the same way as they would be were a plurality of thin, long focal length, solid leanses introduced at appropriate intervals along the axis of the beam. The resultant collimating effect can then be proportioned to substantially eliminate the deleterious effects otherwise introduced by the tendency of the beam to spread.

The temperature gradient and thereby a refractive index gradient is produced and maintained by heating means longitudinally distributed within an elongated gas-filled waveguide to periodically encircle a portion of the space enclosed by the waveguide. The heating means can include a pair of interwined helical members extending along the waveguide or a plurality of discrete ring members spaced at intervals along the conduit. In both cases, the isothermic curves are complicated curves and the wall of the enclosing conduit or waveguide does not coincide with an insothermic surface.

In the prior art, articles by the present Applicant entitled "Guidance of coherent light by a helical guide" in "Annales des Telecommunications", May-June 1969, No. 5-6, Volume 24, pages 177-189 and September-October 1970, Bo. 9-10, Volume 25, pages 320-324, disclose a guide for light wave beams made up of four metal tubes disposed in a helix aound the beam propagation axis. Referring by anticipation to FIG. 1, which represents an aforementioned guide, it can be seen that the cross-sections of the four tubes 1-4 are centered at the four corners of a square and are at a tangent to a single circle centered at the beam axis and having a diameter equal to that of the tubes. A stream of warm water flows through two of the diametrically opposite tubes 1-3 whereas a stream of cold water flows through the other tubes 2-4, so that the isothermic curves in the air between the tubes are equilateral hyperbolas. The circular cross-section of the walls of the four tubes are identical with the osculatory circles at the limiting hyperbolas.

When the cross-section assembly shown in FIG. 1 moves along the beam axis, it rotates through an angle proportional to the distance travelled. The aforementioned articles contain a mathematical description of the propagation of light waves in a system of the aforementioned kind, and the possible guide curvature is calculated. It has also been shown by the present Applicant that the possibilities of curvature can be increased by curving the guide axis not in a circle but in a helix which winds around a circle.

Since the diameter of the free space in which the beam propagates is of the order of a centimeter and the guide is bent in a helix having a pitch of several meters, the position of the isotherms in the guide can with very close approximation be calculated as if the system were cylindrical.

The prior-art system was constructed from standard copper tubes used in plumbing; it showed the correctness of the propagation calculations in the aforementioned article. It was thus possible to show that, to obtain stable isotherms, the guide must be heat-insulated, in which case the cross-section is as shown in FIG. 2, which shows the four tubes 1-4, the sheath 5 and isotherms 6 drawn in thin lines.

SUMMARY OF THE INVENTION

The invention relates to a system for guiding a light beam wherein the index gradient in a gas is due to a temperature gradient which has the same properties as the preceding system with regard to the propagation of the light beam, but has the advantage that its enclosing conduit coincides with an isothermic surface of the heating system and of being manufactured by extrusion in a cable-manufacturing plant, in sections several hundred meters long which are wound on to drums.

BRIEF DESCRIPTION OF THE DRAWINGS

The invention will now be described in detail with reference to the accompanying drawings in which.

DESCRIPTION OF THE PREFERRED EMBODIMENTS

Figure 1:
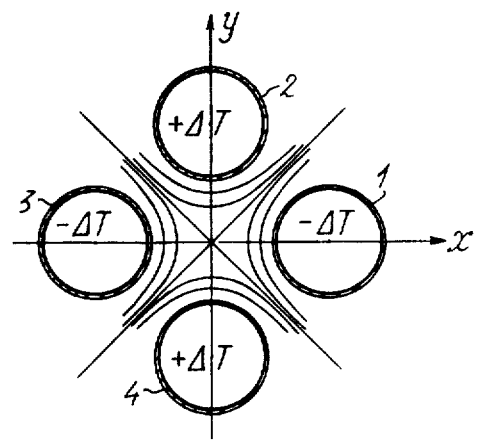
FIGS. 1 and 2 relate to prior-art temperature gradient guide systems and have been described in the introduction.
Figure 2:
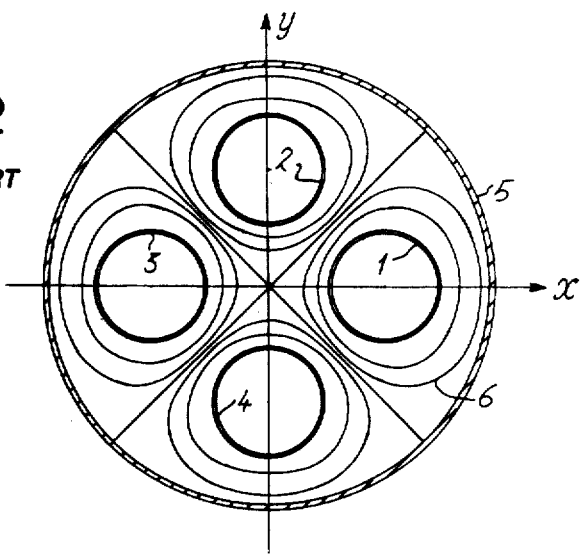

A guide 10 containing air having a temperature gradient comprises an outer metal sheath 11 made e.g. of aluminium and substantially cylindrical, having two diametrically opposite parts 12, 13 with convexity facing the exterior and two diametrically opposite reentrant parts 14, 15 having concavity facing the exterior. Two hollow insulating frames 16, 17 containing heating wires 21-24 are disposed in sheath 11. They have a part 18, 19 respectively in the shape of an arc of a cylinder, having a cross-section adapted to that of parts 12 and 13 of the sheath, and a plane part 20, 25 respectively which at its center follows an isotherm 26, 27 respectively. Wires 21-24 are identical and are brought to the same temperature, of the order of 10° above ambient temperature, by connecting them to an adjustable current source 28.

The wires must occupy well-defined positions with respect to the center of symmetry of the guide cross-section. These positions will be described hereinafter.

When the four straight parallel wires 21-24 are heated, their temperature as already mentioned being of the order of 10° above ambient temperature, no radiation occurs and the dominant phenomenon is flow of heat by conduction in the ambient medium.

In FIG. 4, 31-34 and 41-44 denote two sets of four heating wires and 35-40 inclusive denote the surrounding isothems. Isothem 39 is particularly remarkable since it has the shape of an 8. If the two arms intersect at right angles at the double point at the center, the temperature distribution near this point will be very nearly hyperbolical, but the advantage of the resulting isotherm diagram is that the isothems which were represented by the asymptotes of the hyperbolas in the case of FIG. 1 are now replaced by the 8-shaped curve 39, which is completely contained in isothem 40, along the contour of which the metal sheath 11 is disposed. Since the contour has a constriction, it is particularly suitable since it can easily be used for holding and securing the two insulating holders of the wires.

During permanent operation the flow of heat (like the inductive flux) is conservative. There is a complete formal analogy between the electric field and the temperature gradient. Isothermic surfaces correspond to equipotential surfaces. More specifically, if a straight wire dissipates the power W per unit length of guide in a motionless medium having a heat conductivity coefficient $\eta$, the variation in temperature $\delta T$ versus distance r from the wire is given by:

$$\delta T = \frac{-W}{2\pi\eta} \log r \quad (1)$$

In the base of air, the value of $\eta$ is approximately $2.4 \times 10^{-4}$ W/cm per degree.

In order to study the temperature distribution resulting from a set of wires, we start from a complex plane in a cross-section at right angles to the wires. The origin is on the propagation axis, the coordinates of a current point M $(\rho,\theta)$ are expressed by $\rho \exp j\theta$ and the coordinate of a point where a wire passes through the cross-section plane is expressed by $a \exp j\phi$. The distance between the wire and the current point M is given by the modulus:

$$|a \exp j\phi - \rho \exp j\theta| \quad (2)$$

Formula (1) can be used to obtain the following expression for temperature variations in dependence on $\rho$ and $\theta$:

$$\delta T = \frac{W}{2\pi\eta} \log |a \exp j\phi - \rho \exp j\theta| \quad (3)$$

If the modulus is divided by a constant number, the result is a change in the temperature origin but not in the temperature variations; we can thus write:

$$\delta T = \frac{W}{2\pi\eta} \log \left|1 - \frac{\rho}{a} \exp j(\theta - \phi)\right| \quad (4)$$

In this equation, $\delta T$ expresses the temperature difference between the current point M $(\rho,\theta)$ and the origin. This expression relates to a single wire, and the temperature differences caused by different wires are cumulative, like electrostatic potentials.

Figure 4:
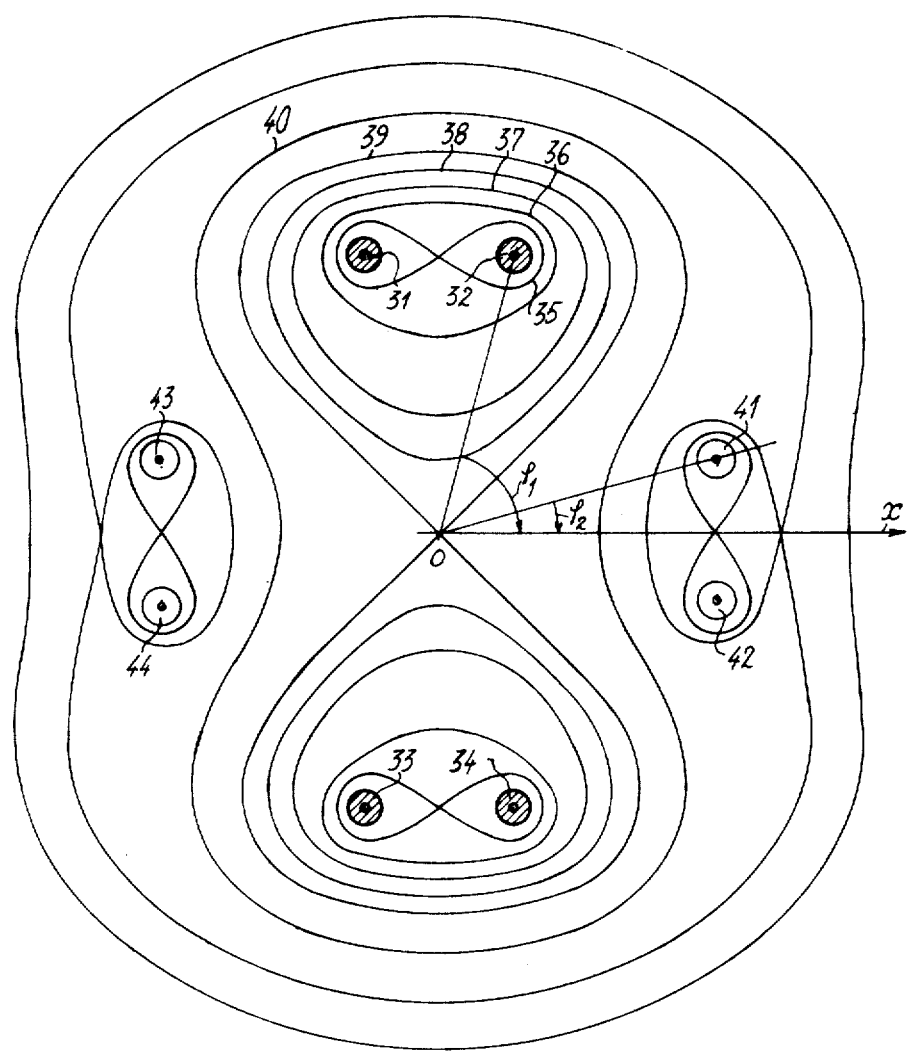
FIG. 4 is a diagram of the isothermic curves for calculating them.
Figure 5:
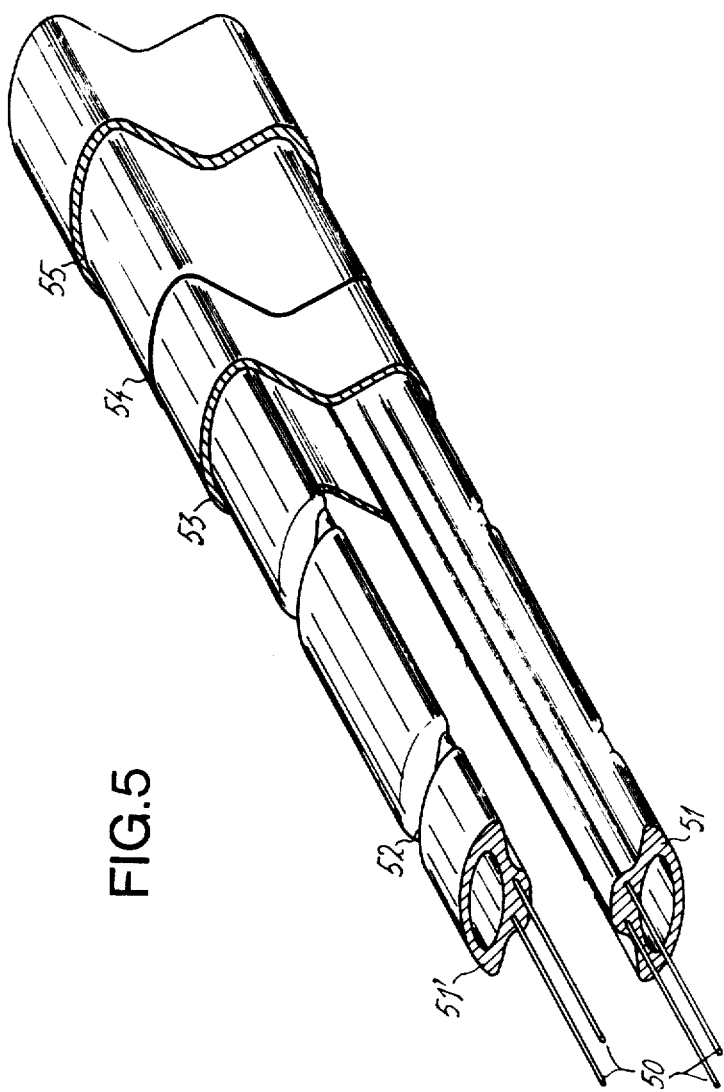
FIGS. 5 and 6 are perspective views of a temperature gradient guide showing the steps in manufacture.

Next, we shall consider sets of wires grouped in fours. FIG. 4 represents two such groups 31-34 and 41-44. Each group of four is characterized by a subscript i; each wire in a group dissipates the same power $W_i/4$ per unit length, and the four wires are at the same distance $a_i$ from the origin and are symmetrical in pairs with respect to the origin. They extend through the plane in FIG. 4 at points having the following azimuths:

$$\phi_i, \ -\phi_i, \ (\pi+\phi_i), \ (\pi-\phi_i)$$

Let $\delta T_i$ be the rise in temperature caused by the four wires in group i. $\delta T_i$ can be given either a total expression for completely calculating the isothermic curves, of a series expansion for small values of $\rho$ in order to study the properties of the system near the origin.

The total expression for $\delta T_i$ for the four wires is:

$$\delta T_i = \frac{W_i}{8\pi\eta} \log \left|1 - 2 \cos 2\phi_i \left(\frac{u}{a_i}\right)^2 + \left(\frac{u}{a_i}\right)^4\right| \quad (5)$$

putting $u = \rho \exp j\theta$, since, by adding the logarithms of the moduli given in (4), we obtain the logarithm of the product of the moduli, which is equal to the logarithm of the modulus of the product.

The series expansion is:

$$\delta T_i = \frac{W_i}{4\pi\eta} \sum_{n=1}^{\infty} \frac{\rho^{2n}}{n a_i^{2n}} \cos 2n\theta \cos 2n\phi_i \quad (6)$$

Starting from formula (4) we note that the logarithm of the modulus is equal to the real part of the logarithm of the complex number. Accordingly, formula (4) is expanded in series, retaining only the real part of the terms in the expansion. The odd terms cancel out since the terms where $\phi$ has the value $\pm\phi_i$ and the terms where $\phi$ has the value $(\pm\phi_i + \pi)$ are equal and of opposite sign for exponents having the form (2n-1). Next, by adding the terms in $\cos(\theta - \phi_i)$ and the terms in $\cos(\theta + \phi_i)$ we obtain the series written above.

The total temperature difference $\delta T_s$ is the sum of the differences $\delta T_i$:

$$\delta T_s = \sum_i \delta T_i \quad (7)$$

The total difference must be such that the temperature distribution near the center is hyperbolic, i.e. the expression for $\delta T_s$ where the $\delta T_i$ terms are given by (6) must reduce to a term in $\rho^2 \cos 2\theta$, the upper harmonics being negligible. The mastmentioned term expresses the hyperbolic distribution, as can be clearly seen by changing over to cartesian coordinates:

$$\rho^2 \cos 2\theta = (\rho \cos \theta)^2 - (\rho \sin \theta)^2 = x^2 - y^2 \quad (8)$$

If the sum $\delta T_s$ (7) of the temperature differences is obtained by giving the $\delta T_i$ terms their values from (6), we see that the maximum coefficient of $\rho^2 \cos 2\theta$ must be:

$$\delta T_s = \frac{\rho^2 \cos 2\theta}{2\pi\eta} \sum_i \frac{W_i}{a_i^2} \cos 2\phi_i \quad (9)$$

The coefficients of $\rho^4 \cos 4\theta$, $\rho^6 \cos 6\theta$, etc., which must be zero, are:

$$\left.\begin{array}{l} \sum_i \dfrac{W_i}{a_i^4} \cos 4\phi_i = 0 \\[6pt] \sum_i \dfrac{W_i}{a_i^6} \cos 6\phi_i = 0 \end{array}\right\} \quad (10)$$

Since these equations are linear and homogeneous in $W_i$, a number of harmonics equal to the number of groups of four wires can be cancelled.

If we limit ourselves to the cancellation of the first two harmonics, we can make this with two sets of four wires. One set absorbs heat but this is unimportant since, by construction, it will be outside the sheath and will serve only as an intermediate term in the calculation.

The calculation is particularly simple if the angles $\phi_1$ and $\phi_2$ relating to the two sets are complementary, as shown in FIG. 4. We then put:

$$\phi_1 = \phi \qquad \phi_2 = \frac{\pi}{2} - \phi \quad (11)$$

and equations (9) and (10) are written as follows:

$$\left.\begin{array}{l} \delta T_s = \dfrac{\rho^2 \cos 2\theta}{2\pi\eta}\left(\dfrac{W_1}{a_1^2} - \dfrac{W_2}{a_2^2}\right)\cos 2\phi \\[8pt] 0 = \left(\dfrac{W_1}{a_1^4} + \dfrac{W_2}{a_2^4}\right)\cos 4\phi \\[8pt] 0 = \left(\dfrac{W_1}{a_1^6} - \dfrac{W_2}{a_2^6}\right)\cos 6\phi \end{array}\right\} \quad (12)$$

The system has the following solution:

$$\phi = \frac{1}{6}\left(\frac{\pi}{2} + k\pi\right) \text{ hence } \phi_1 = \frac{\pi}{12} \text{ and } \phi_2 = \frac{5\pi}{12} \quad (13)$$

$$W_2 = \frac{a_2^4}{a_1^4} W_1$$

hence:

$$\delta T_s = \frac{\sqrt{3}}{4\pi\eta}\left(1 + \frac{a_2^2}{a_1^2}\right)\frac{W_1}{a_1^2} \rho^2 \cos 2\theta \quad (14)$$

$W_1$ represents the entire energy supplied to the system. The energy $W_2$ should be smaller in absolute value than $W_1$, since part of the energy $W_1$ propagates to infinity.

Equation (14) gives the temperature distribution at the center of the guide where the beam propagates. In order to obtain the general equation of the isotherms, we must insert the results in the general expression (5). We obtain:

$$\delta T_s = \quad (15)$$
$$\frac{W_1}{8\pi\eta}\left[\mathrm{Log}\left|1 - \frac{\sqrt{3}\,u^2}{a_1^2} + \frac{u^4}{a_1^4}\right| - \frac{a_2^4}{a_1^4}\mathrm{Log}\left|1 + \frac{\sqrt{3}\,u^2}{a_1^2} + \frac{u^4}{a_1^4}\right|\right]$$

This expression corresponds to the isotherms in FIG. 4. The cross-section of the metal sheet round the guide is identical with isotherm 40. Consequently, wires 41–44 which absorb energy are outside the isotherm, and purely imaginary. The temperature gradient waveguide only comprises a set of four heating wires and an enclosing conduit which coincides with an isothermic surface.

The aluminium sheath 11 is suitable, firstly because it is a good conductor of heat and consequently is efficient at fixing the isotherm and secondly because it transmits low-frequency magnetic fields, so that the position and orientation of a probe bearing a photoelectric cell can be magnetically controlled from outside the conduit, so as to measure the intensity of the beam at various points across the conduit cross-section, so that the beam can be accurately positioned with respect to the enclosing conduit. In the guide, the air flow must be slow and laminar, i.e. without turbulence, to avoid convection currents. Owing to the helical shape of the guide, the mass of flowing air rotates around the axis and is sometimes in one direction and sometimes in the opposite direction with respect to the gravitational forces producing convection.

The simplifying assumption that $\phi_1$ and $\phi_2$ are complementaty was adopted to simplify the description; of course, this assumption is not necessary, but the result will be a much more complicated description without notable change in the conclusions.

A guide of the aforementioned kind was efficiently constructed using conventional cable-manufacturing machines. A first operation consists in embedding the resistive wires 50, e.g. of nickel-chromium alloy, in a hollow insulating frame 51 obtained by extrusion and simultaneous moulding of a suitable thermoplastics. The substance used can e.g. be a high-density polyethylene having a softening point which is not below 110° C. Advantageously, the insulating frame is strengthened by covers or transverse grooves 52 obtained by the method used for insulating coaxial cables as described in U.S. Pat. No. 3,520,023 and 3,881,851.

The flexible sectional member is obtained in continuous manner and wound on to cable drums.

A second operation consists in assembling the various guide components, i.e. the aluminium conductor 53 and the two flexible sectional members 51 and 51', at the time when the aluminium conductor is made.

Figure 3:
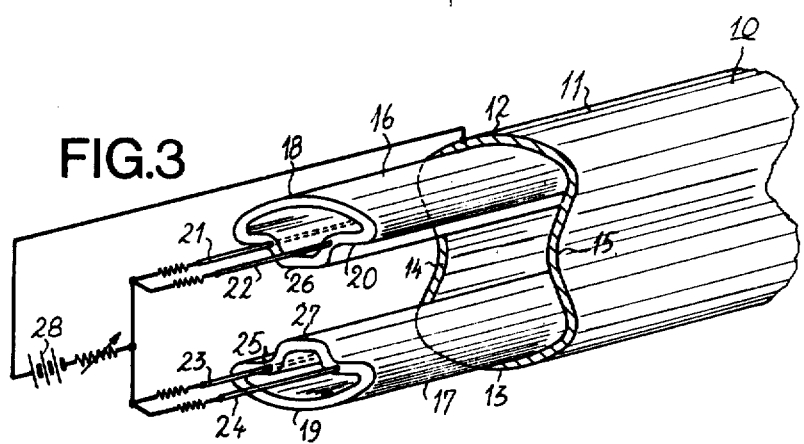
FIG. 3 is a partly cut-away view of a portion of a temperature gradient guide according to the invention.

To this end, a single machine receives a flat strip of aluminium and two flexible sectional members. The flat strip of aluminium is first preformed by a roller and die system, then closed on itself around the two pre-positioned flexible sectional members, then longitudinally welded by a known method such as arc welding in argon or welding by high-frequency currents and finally calibrated to the final shape by sending it through a lubricated metal die. The resulting product is wound flat on to a drum so that one of the surfaces 14 or 15 (FIG. 3) is at a tangent or parallel to the drum barrel.

During a subsequent winding-on operation, i.e. the transition from one drum to another, the outer surface of the resulting cable is degreased, dried and brushed so that a layer of passivating paint 54 based on zinc dichromate can be applied to the aluminium sheath. After the paint has been applied, the cable is covered with a pure lead sheath 55 about 2 mm thick, using a lead extruder of a kind known in cable manufacturing.

Figure 6:
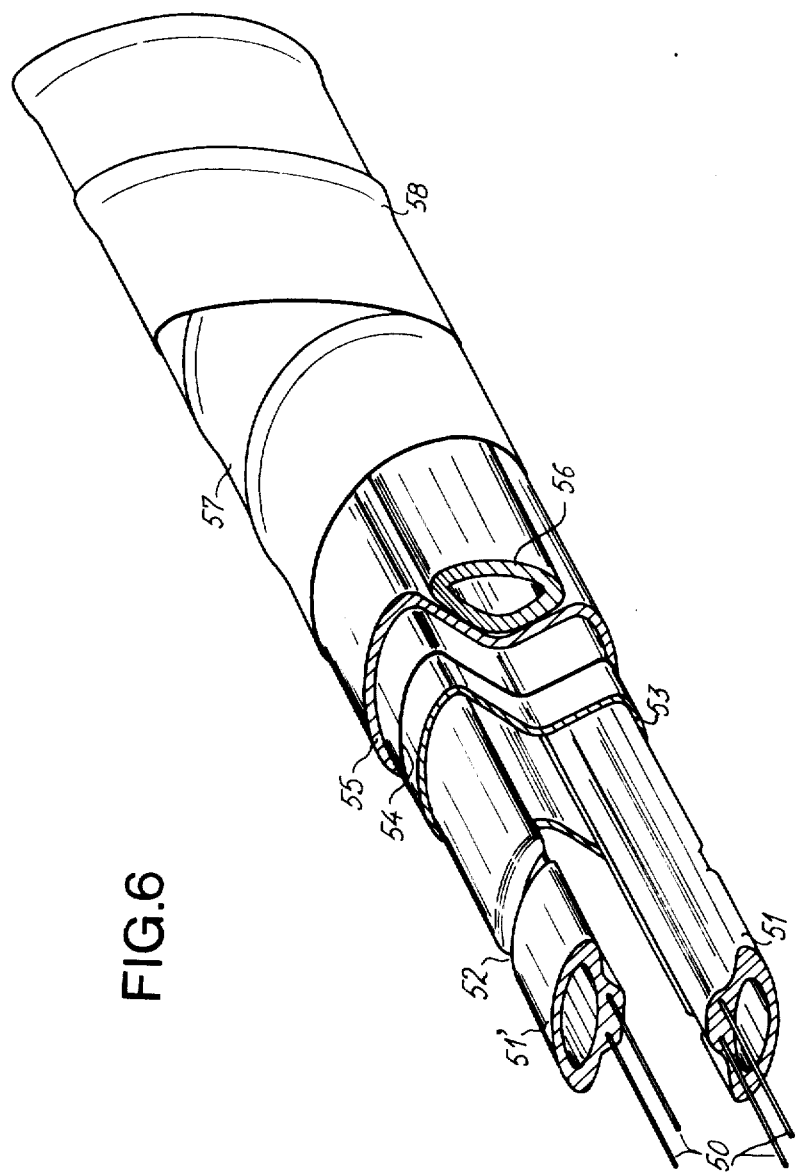

The resulting cable is unwound and twisted at a pitch of 7.5 m by sending it through a known assembler, e.g. a rotating-cage assembler. At this stage, two plastics pads 56 (only one of which is shown in FIG. 6) are positioned so as to fill the outer concavities in the guide. Pads 56 are held in position by one or more strips 57, 58 of ethylene or polyethylene terephthalate.

The resulting product has a circular cross-section and can thus be easily wound on to a drum. When the cable if laid, the two plastics pads, which have previously been obtained by extrusion, are removed and can, if required, be returned to the factory on empty drums for re-use.

Figure 7:
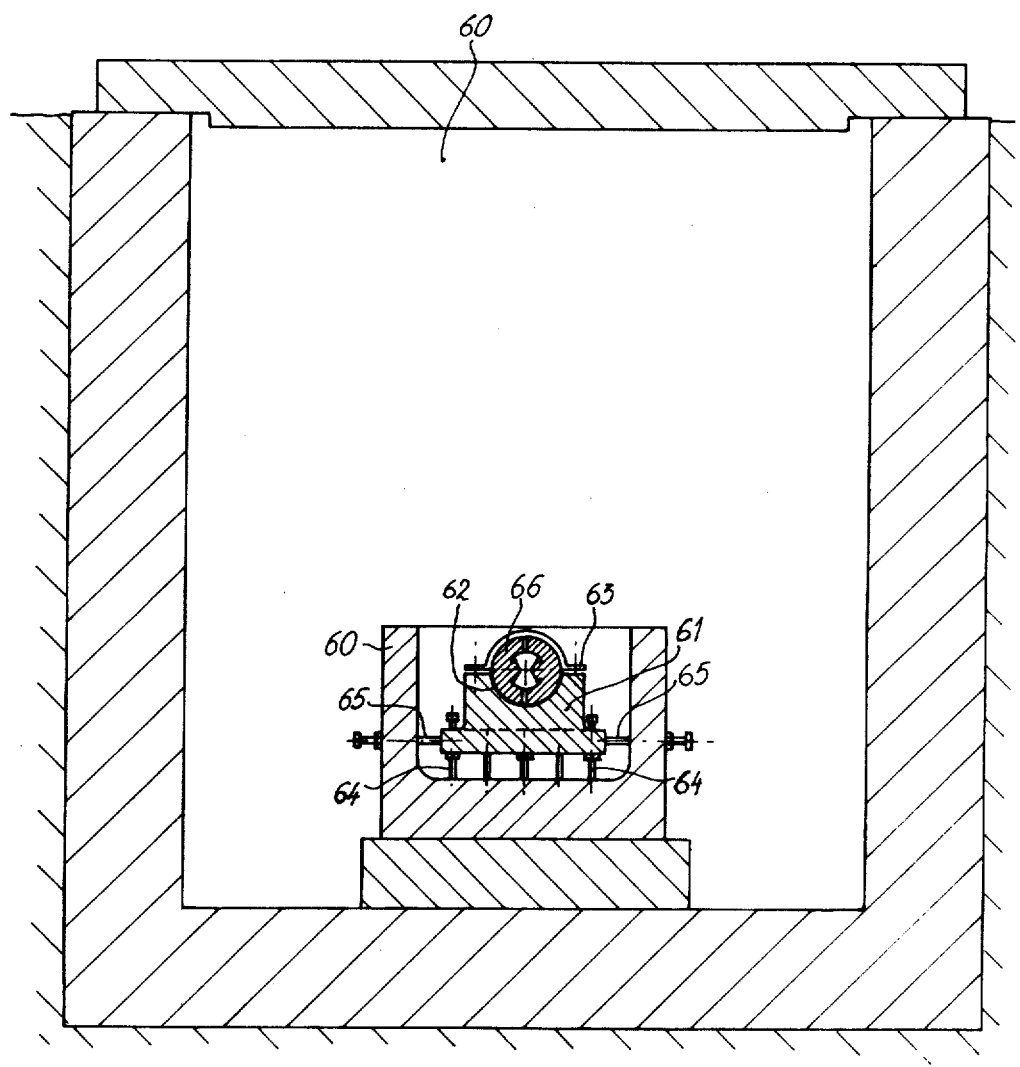
FIG. 7 is a view showing how the cable is laid in a conduit.

When used, guide 66 is placed in a conduit 60 (FIG. 7) at the bottom of which it is placed in a holder 61 having a groove 62 equal in diameter to the cable and held by a stirrup 63. The height of holder 61 is adjusted by screws 64, and its lateral position with respect to the guide is adjusted by screws 65. In each holder, the cable has a given orientation around its axis, in order accurately to conform with the twisting pitch of the guide.

The guide is constructed so as to be sealing-tight. During normal use, a slow flow of air in the guide is sufficient to obtain good transmission. However, greater efficiency may be obtained if the gas flowing in the guide has only low absorption for the wavelengths of the transmitted radiation.

What we claim is:

1. A guide for light or infrared wave beam having a temperature gradient in a gas, said guide comprising:
   an isothermic metal sheath filled with gas, having a helical shape in the axial direction and a cross-section having two diametrically opposite convex parts and two diametrically opposite concave parts forming a constriction;
   four conductive heater wires symmetrically located inside said sheath in pairs with respect to the center of symmetry of the sheath; and
   two insulating cylindrical holders inside said sheath, each bearing two of said conductive heater wires and having the shape of a plane convex segment in cross-section, the convex parts of the segments being in the convex parts of the sheath and held in position by the constriction in the sheath.

2. A guide for light or infrared wave beam according to claim 1, in which the insulating cylindrical holders are hollow tubes.

3. A guide for light or infrared wave beam according to claim 1, wherein the plane part of the plane-concave segment-shaped insulating cylindrical holders has a flat central part and the heater wires are embedded in the segments on either side of the foot of the flat central part.

4. A guide for light or infrared wave beam according to claim 1, wherein the heater wires are disposed in axial planes forming angles of $\pm \pi/12$ with the axial plane of the sheath perpendicular to the constriction.

5. A guide for light or infrared wave beam according to claim 1, wherein the metal sheath is sealing-tight and a gas which is only slightly absorbent at the radiation wavelengths transmitted by the guide flows therein.

6. A guide for light or infrared wave beam according to claim 1, comprising two hollow pads inside the convex parts of the isothermic metal sheath, and means for holding the pads in position and separating them from the guide when the latter is laid.

* * * * *